July 11, 1944.    A. P. COTTON    2,353,391
DRAWER ATTACHMENT FOR AUTOMOBILES
Filed Nov. 16, 1940    2 Sheets-Sheet 1

Inventor
Aubrey P. Cotton
By Clarence A. O'Brien
Attorney

July 11, 1944.    A. P. COTTON    2,353,391
DRAWER ATTACHMENT FOR AUTOMOBILES
Filed Nov. 16, 1940    2 Sheets-Sheet 2
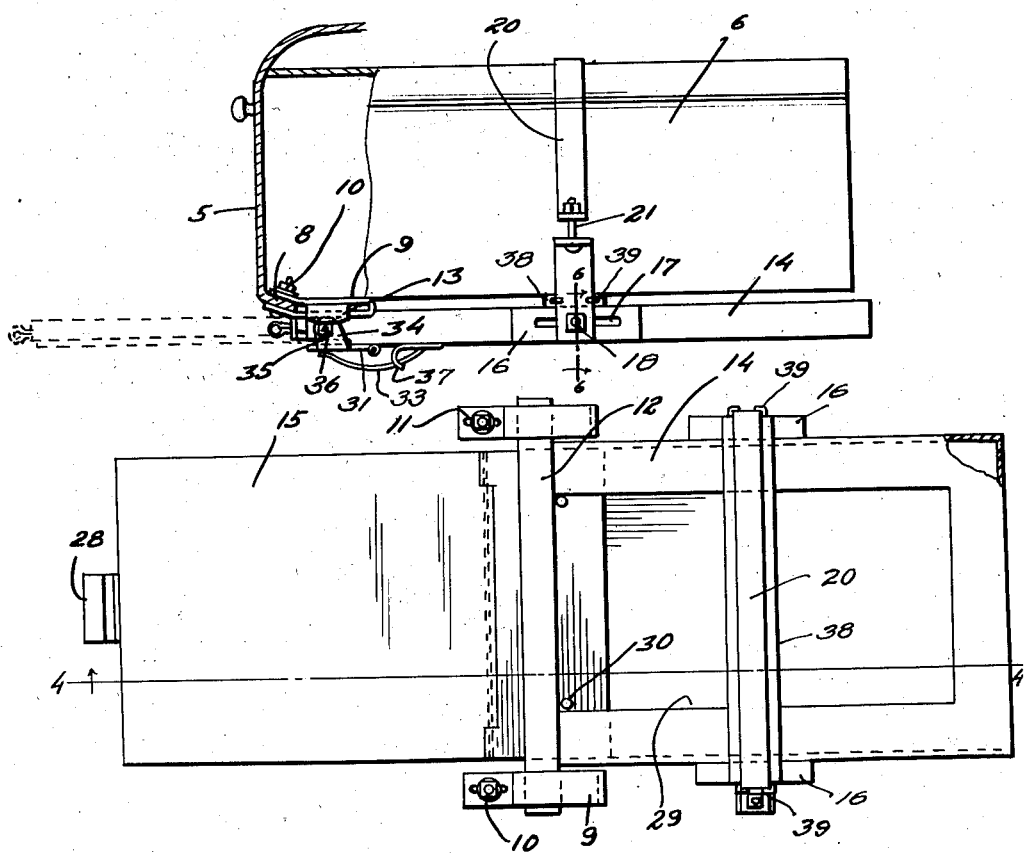
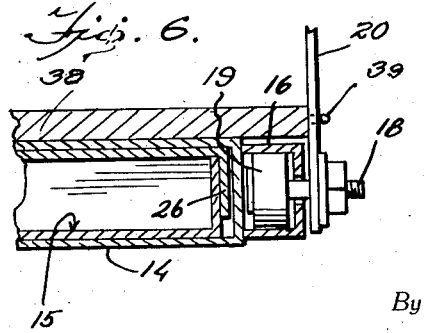
Inventor
Aubrey P. Cotton
By Clarence A. O'Brien
Attorney Patented July 11, 1944

2,353,391

UNITED STATES PATENT OFFICE 2,353,391

DRAWER ATTACHMENT FOR AUTOMOBILES

Aubrey P. Cotton, St. Matthews, S. C.

Application November 16, 1940, Serial No. 366,016

3 Claims. (Cl. 296—19.5)

The present invention relates to new and useful improvements in drawer attachments for automobiles and has for its primary object to provide a sliding drawer supported beneath the usual glove compartment of an automobile and embodying a hinged cover for the drawer adapted to form a shelf capable of use as a writing support, as well as for supporting other objects in position thereon when the drawer is moved outwardly.

An important object of the present invention is to provide novel attaching means for securing the drawer to the under side of the instrument panel of the automobile, and also for hanging the drawer beneath the glove compartment and for properly adjusting the drawer in accordance with various types of automobile construction.

A still further object is to provide a compartment for slidably accommodating the drawer and in which the compartment is constructed with a yieldable front edge adapted to compensate for any inclination of the glove compartment to which the drawer is attached whereby to enable the drawer to be supported in a true horizontal position when the drawer is pulled outwardly of its compartment.

An additional object is to provide a device of this character of simple and practical construction, which is neat and attractive in appearance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
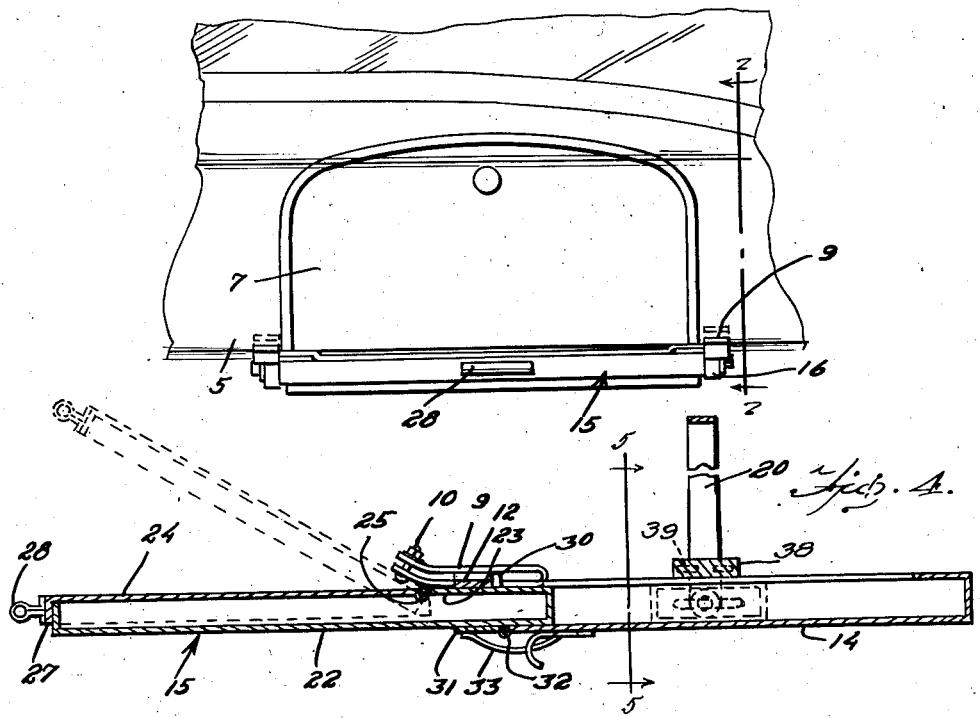
Figure 5:
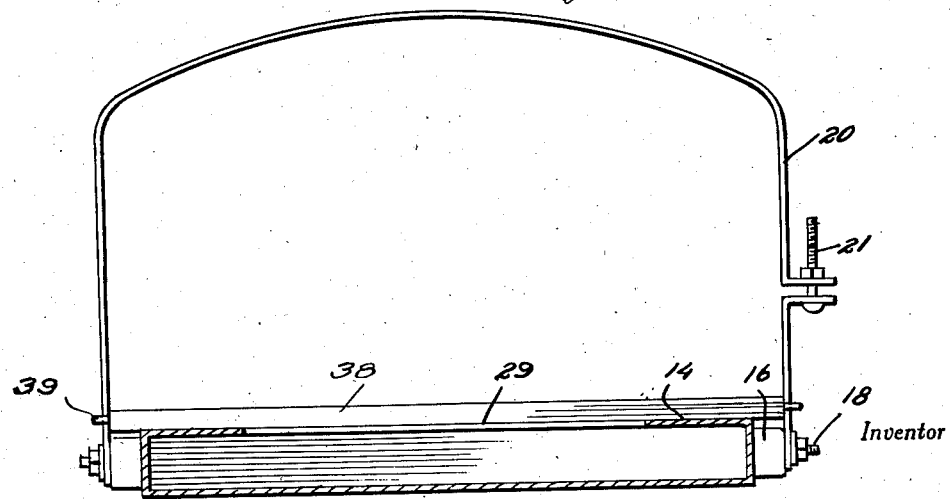

Figure 1 is a fragmentary front elevational view of the instrument panel of an automobile showing the drawer in position thereon, Figure 2 is a sectional view taken substantially on a line 2—2 of Figure 1 and with parts shown in section, Figure 3 is a top plan view of the drawer and supporting compartment therefor detached from the automobile, Figure 4 is a longitudinal sectional view taken substantially on a line 4—4 of Figure 3, Figure 5 is a vertical sectional view taken substantially on a line 5—5 of Figure 4, and Figure 6 is a fragmentary sectional view through one of the adjustable supports for the hanger taken substantially on a line 6—6 of Figure 2.

Referring now to the drawings in detail wherein for the purposes of illustration I have disclosed a preferred embodiment of the invention, the numeral 5 designates the instrument panel of an automobile having the usual glove compartment 6 formed therein provided with the hinged door 7 at its front end. The lower edge of the instrument panel is usually provided with the inturned flange 8 and secured to this flange is a pair of U-shaped attaching brackets 9, the brackets extending horizontally inwardly from the flange and secured at their end portions to the flange by means of bolts 10, the bolts being adjustable in slots 11 formed in the brackets.

A horizontally disposed hanger bar 12 has its end portions freely inserted through the brackets 9, the ends of the bar being bent downwardly as shown at 13 to prevent removal of the bar from the bracket.

The bar 12 is welded or otherwise secured to the upper surface of a substantially flat metal drawer compartment 14, the bar 12 being positioned adjacent the end of the compartment and said front end of the compartment is open for slidably receiving a drawer designated generally at 15.

To each side edge of the compartment 14 is secured a box-like structure 16 having a longitudinally extending slot 17 in its side edge for adjustably receiving a bolt 18. Mounted on the inner end of the bolt is a roller 19 loosely bearing against the top and bottom of the box 16 for free movement of the roller in the box.

Attached to each of the bolts 18 is a U-shaped flexible metallic hanger strap 20, the hanger extending transversely across the top of the glove compartment 6 and the hanger is constructed of sections connected by an adjusting bolt 21 positioned at one side of the compartment.

The drawer 15 includes a tray portion 22 and the rear portion of the drawer is provided with a partial top 23 to the front edge of which a lid or cover 24 is hingedly connected as at 25.

The lid or cover 24 is provided with downturned side flanges 26 and a downturned front flange 27 positioned outwardly of the side walls of the tray portion 22 of the drawer, and the front flange 27 is formed with a hand grip 28.

The top of the compartment 14 is formed with an enlarged opening 29 and projecting upwardly from the top 23 of the drawer is a pair of stop pins 30 which project upwardly through the opening 29 and are adapted to engage the hanger bar 12 to limit outward movement of the drawer.

An extension 31 is hingedly connected as at 32 to the front edge of the bottom portion of the compartment 14, the extension being formed as a continuation of said bottom of the compartment.

A leaf spring 33 has its rear end welded or otherwise secured to the under side of the compartment 14 and its front end projected forwardly and freely engages the under side of the extension 31 to yieldably maintain the extension in an upwardly and horizontally disposed position. An upturned ear 34 is formed at each end of the extension 31, the ears being positioned outwardly of the side edges of the compartment 14. A slot 35 is formed in each of the ears for receiving a bolt 36 which is secured at its inner end to the side of the compartment 14 and projects outwardly therefrom through said slot, the bolts and ears limiting downward movement of the extension 31.

In the operation of the device the compartment 14 is properly adjusted and secured in position under the glove compartment 6 by means of the attaching brackets 9 and the hanger strap 20, a finger gripping hook 37 secured to the under side of the compartment being provided for moving the compartment from its normally concealed position under the glove compartment 6, as shown by the full lines in Figure 2, into a forwardly projected position for grasping the handle 28 to slide the drawer 15 outwardly of the compartment 14, as shown by the dotted lines in Figure 2.

The drawer 15 is adapted to contain writing paper or other articles of stationery, pamphlets or the like and is free to be moved inwardly and outwardly of the compartment 14. When the drawer is moved outwardly the lid or cover 24 may serve as a shelf or support while writing or for other purposes.

In certain types of vehicles where the glove compartment 6 is supported in an inclined position, the pivoted extension 31 will permit the drawer 15 to swing slightly downwardly against the tension of the spring 33 to compensate for the inclination of the glove compartment, and thus supports the drawer in a proper horizontal position.

A spacer bar 38 is positioned transversely across the top of the compartment 14 and under the compartment 6 to maintain the compartment 14 in a horizontal position, the bar 38 having a pair of inturned hooks 39 at each end slidably connecting the bar to the strap 20.

It is believed the details of construction, operation and advantages of the device will be readily understood from the foregoing without further detailed explanation.

Having thus described the invention, what I claim is—

1. Means for detachably supporting a utility compartment under a fixed compartment in the instrument panel of an automobile and comprising a pair of horizontally arranged U-shaped clamping devices at the front side edges of the utility compartment adapted for receiving and attaching to the lower edge of the instrument panel, and extending rearwardly therefrom under said fixed compartment, a bar extending transversely of the utility compartment, and having its ends slidably supported in said clamping devices; and a strap slidably supporting the utility compartment adjacent its rear end and adapted for extending over the top of the fixed compartment of the automobile.

2. A utility compartment for automobiles and attaching means therefor and comprising tracks secured to the opposite sides of the compartment adjacent its rear end, rollers supported by the tracks for movement longitudinally of the compartment, to slidably adjust the compartment a hanger strap having its ends attached to the rollers and adapted to embrace the glove compartment of said automobile, and attaching means slidably supporting the front end of the compartment.

3. Attaching means of a utility compartment of an automobile and comprising supporting members for the front end of the compartment adapted to be secured to the instrument panel of the automobile and supporting the front end of the compartment for sliding movement thereof into and out of position under the panel, and means adapted to embrace the glove compartment of said automobile for slidably supporting the utility compartment at a point rearwardly of the front end thereof.

AUBREY P. COTTON.